United States Patent
Naganawa et al.

(10) Patent No.: US 11,970,654 B2
(45) Date of Patent: Apr. 30, 2024

(54) DRILLING FLUID, DRILLING METHOD, AND DRILLING FLUID ADDITIVE

(71) Applicants: AKITA UNIVERSITY, Akita (JP); KANEKA CORPORATION, Osaka (JP)

(72) Inventors: Shigemi Naganawa, Akita (JP); Ryutaro Mukai, Settsu (JP)

(73) Assignees: AKITA UNIVERSITY, Akita (JP); KANEKA CORPORATION, Osaka (JP)

(*) Notice: Subject to any disclaimer, the term of this patent is extended or adjusted under 35 U.S.C. 154(b) by 38 days.

(21) Appl. No.: 17/614,807

(22) PCT Filed: Jun. 4, 2020

(86) PCT No.: PCT/JP2020/022090
§ 371 (c)(1),
(2) Date: Nov. 29, 2021

(87) PCT Pub. No.: WO2020/246541
PCT Pub. Date: Dec. 10, 2020

(65) Prior Publication Data
US 2022/0228048 A1     Jul. 21, 2022

(30) Foreign Application Priority Data
Jun. 7, 2019   (JP) .................................. 2019-107351

(51) Int. Cl.
*C09K 8/035*   (2006.01)
*C09K 8/12*    (2006.01)
*C09K 8/52*    (2006.01)

(52) U.S. Cl.
CPC ............... *C09K 8/035* (2013.01); *C09K 8/12* (2013.01); *C09K 8/52* (2013.01); *C09K 2208/08* (2013.01)

(58) Field of Classification Search
None
See application file for complete search history.

(56) References Cited

U.S. PATENT DOCUMENTS 5,785,747 A     7/1998  Vollmer et al.
6,013,590 A *   1/2000  Noda ................... C08G 63/08
                                              528/343

(Continued)

FOREIGN PATENT DOCUMENTS

JP    2013-87392 A     5/2013
JP    2017-218681 A    12/2017

(Continued)

OTHER PUBLICATIONS

International Search Report dated Sep. 1, 2020 in PCT/JP2020/022090 filed on Jun. 4, 2020, citing document AA therein, 2 pages

*Primary Examiner* — Andrew Sue-Ako
(74) *Attorney, Agent, or Firm* — Oblon, McClelland, Maier & Neustadt, L.L.P.

(57) ABSTRACT

An object of the present invention is to provide an environmentally friendly drilling fluid that has excellent cuttings transport capability and excellent hole cleaning capability. A drilling fluid according to the present disclosure is a drilling fluid containing water, biodegradable fibers, and a thickener. The thickener contains a biodegradable polysaccharide. The content of the biodegradable polysaccharide in the drilling fluid is greater than or equal to 0.01 g/L and less than or equal to 5 g/L.

14 Claims, 5 Drawing Sheets

(56) References Cited

U.S. PATENT DOCUMENTS

| | | | |
|---|---|---|---|
| 6,016,872 A | 1/2000 | Davis | |
| 6,164,380 A | 12/2000 | Davis | |
| 2013/0112414 A1* | 5/2013 | Kumar | E21B 7/00 166/300 |
| 2015/0159477 A1* | 6/2015 | Lecerf | E21B 43/267 166/250.1 |
| 2016/0108713 A1 | 4/2016 | Dunaeva et al. | |
| 2017/0081585 A1 | 3/2017 | Bestaoui-Spurr et al. | |

FOREIGN PATENT DOCUMENTS

| | | |
|---|---|---|
| WO | WO 2018/031431 A1 | 2/2018 |
| WO | WO 2019/099485 A1 | 5/2019 |

* cited by examiner

DRILLING FLUID, DRILLING METHOD, AND DRILLING FLUID ADDITIVE

DESCRIPTION

Techincal Field

The present invention relates to a drilling fluid, a drilling method, and a drilling fluid additive.

Background Art

A drilling fluid, which is also called drilling mud, is used for various purposes. For example, the drilling fluid is fed into a well for oil-well drilling or the like, and is caused to flow inside the well to remove and transport cuttings from the bottomhole and from the vicinity of a drill bit to the ground surface; the drilling fluid is also used as a lubricant/coolant for the drill bit; and the drilling fluid is also used for maintaining the stability of the well.

At the time of drilling a well, settling and accumulation of cuttings as well as insufficient hole cleaning cause drilling failures. Examples of the drilling failures include: increase in a non-productive time, such as a time for the work of raising and lowering a drill string; early wear of the drill bit; and a bottomhole assembly (the distal end of the drill string) getting stuck (i.e., becoming unable to move).

The transporting of the cuttings (hereinafter, "cuttings transport") depends on various factors, such as the fluid properties of the drilling fluid, the inclination angle of the well, the rotation speed of a drill pipe; the flow velocity of the drilling fluid; the shape of the well; and other drilling parameters. Therefore, for the improvement of the cuttings transport, additives such as a weighting agent, a dispersant, a thickener, fibers, etc., are added to the drilling fluid.

As one of such additives for facilitating discharging of the cuttings from the well, Patent Literatures 1 and 2 each disclose hydrophilic fibers selected from the group consisting of polyolefin fibers, polyester fibers, and nylon fibers.

The following terms used in the present disclosure are explained in advance.

Drill bit: a component serving as a drilling edge.
Drill pipe: a pipe that transmits rotational power to the drill bit. A drilling fluid is flowed through the inside of the drill pipe to be fed to a region that is being drilled by the drill bit, and the drill pipe can cause the drilling fluid to flow inside the well.
Annulus: a region outside the drill pipe, the region allowing the drilling fluid to flow therein.

CITATION LIST

Patent Literature

PTL 1: U.S. Pat. No. 6,164,380
PTL 2: U.S. Pat. No. 6,016,872

SUMMARY OF INVENTION

Technical Problem

In a high shear rate region, such as the inside of the drill pipe or the vicinity of the drill bit, the lower the viscosity of the drilling fluid, the more the pressure loss in the drill pipe can be reduced, and thereby the thrust of a jet flow of the drilling fluid from the drill bit can be increased, which is advantageous for increasing the efficiency of the cuttings transport and hole cleaning. Also, after the drilling fluid has been used, the cuttings can be efficiently removed from the drilling fluid if the viscosity of the drilling fluid is low.

On the other hand, in a low shear rate region, such as the annulus, if the viscosity of the drilling fluid is high, it is advantageous for the efficiency of the cuttings transport and hole cleaning.

In the case of a conventional drilling fluid, if the drilling fluid is prepared such that the viscosity thereof is kept low in the high shear rate region, then the viscosity of the drilling fluid tends to be reduced in the low shear rate region. If the viscosity of the drilling fluid in the low shear rate region is reduced excessively, the properties of the drilling fluid deviate from pseudoplastic fluid properties or Bingham fluid properties, which are necessary rheological properties for the drilling fluid. This results in insufficient cuttings transport capability and insufficient hole cleaning capability.

In particular, in the case of performing well drilling for oil development, natural gas development, or geothermal development, particularly in the case of performing well drilling for geothermal development, there may be a situation where, depending on the temperature condition and/or the pressure condition of a stratum, it is unavoidable to use a drilling fluid having a low viscosity or low specific gravity, which is disadvantageous for the efficiency of cuttings transport. In the case of performing well drilling in such a situation, if the viscosity of the drilling fluid in the low shear rate region, such as the annulus, tends to be reduced, it is more disadvantageous particularly for the efficiency of cuttings transport and hole cleaning.

In the case of a drilling fluid to which conventional additives are added, if the drilling fluid is prepared to increase the viscosity thereof in the low shear rate region, the viscosity of the drilling fluid in the high shear rate region is also increased, accordingly. If the viscosity of the drilling fluid in the high shear rate region is increased excessively, it causes a loss of fluidity of the drilling fluid, which results in insufficient cuttings transport capability and hole cleaning capability.

Further, well drilling is performed in various environments, such as a flat land, mountainous land, river, canal, ocean, etc., to form a structure below the ground surface. For this reason, as a result of the well drilling, if poorly biodegradable additives are, for example, discarded or dumped into the environment, or remain as a residue in the environment, the load on the environment is significant.

An object of the present invention is to provide an environmentally friendly drilling fluid that has excellent cuttings transport capability and excellent hole cleaning capability.

Solution to Problem

A first aspect of the present disclosure relates to a drilling fluid containing water, biodegradable fibers, and a thickener. The thickener contains a biodegradable polysaccharide. A content of the biodegradable polysaccharide in the drilling fluid is greater than or equal to 0.01 g/L and less than or equal to 5 g/L.

In the drilling fluid, the thickener may be the biodegradable polysaccharide.

In the drilling fluid, the biodegradable fibers may be fibers made of a polyhydroxyalkanoate.

In the drilling fluid, the polyhydroxyalkanoate may contain a 3-hydroxyalkanoic acid represented by the following general formula (1):

(1), and in the general formula (1), R is an alkyl group represented by $C_pH_{2p+1}$, and p is an integer within a range of 1 to 15.

In the drilling fluid, the polyhydroxyalkanoate may be poly(3-hydroxybutyrate-co-3-hydroxyhexanoate).

In the drilling fluid, the biodegradable fibers may have a fiber length of greater than or equal to 3 mm and less than or equal to 100 mm.

In the drilling fluid, a content of the biodegradable fibers may be, relative to 100 parts by weight of the thickener, greater than or equal to 5 parts by weight and less than or equal to 500 parts by weight.

In the drilling fluid, the biodegradable polysaccharide may be at least one selected from the group consisting of carboxymethyl cellulose, polyanionic cellulose, xanthan gum, and guar gum.

A second aspect of the present disclosure relates to a drilling method that includes drilling a well while feeding a drilling fluid into the well, and discharging cuttings that are produced by the drilling to outside the well. The drilling fluid contains water, biodegradable fibers, and a thickener. The thickener contains a biodegradable polysaccharide. A content of the biodegradable polysaccharide in the drilling fluid is greater than or equal to 0.01 g/L and less than or equal to 5 g/L.

In the drilling method, the thickener may be the biodegradable polysaccharide.

In the drilling method, the drilling may be riser drilling or riserless drilling in a marine environment.

In the drilling method, the drilling may be riserless drilling in a marine environment.

A third aspect of the present disclosure relates to a drilling fluid additive containing fibers made of poly(3-hydroxybutyrate-co-3-hydroxyhexanoate).

Drilling in which the drilling fluid additive is used may be riser drilling or riserless drilling in a marine environment.

Drilling in which the drilling fluid additive is used may be riserless drilling in a marine environment.

Advantageous Effects of Invention

The present invention makes it possible to provide an environmentally friendly drilling fluid that has excellent cuttings transport capability and excellent hole cleaning capability.

BRIEF DESCRIPTION OF DRAWINGS

FIG. 1 shows results of plotting a shear stress at each of different shear rates on a double logarithmic graph regarding the following drilling fluids: a drilling fluid containing a biodegradable polysaccharide in an amount of 2.5 g/L and biodegradable fibers with an average fiber length of 15 mm in an amount of 0 g/L (Comparative Example 1-1); a drilling fluid containing the biodegradable polysaccharide in an amount of 2.5 g/L and the biodegradable fibers with an average fiber length of 15 mm in an amount of 0.5 g/L (Example 1-1); and a drilling fluid containing the biodegradable polysaccharide in an amount of 2.5 g/L and the biodegradable fibers with an average fiber length of 15 mm in an amount of 1.0 g/L (Example 1-2), the graph having a vertical axis representing the shear stress (Pa) and a horizontal axis representing the shear rate (1/s).

FIG. 2 shows results of plotting a viscosity at each of the different shear rates on a double logarithmic graph regarding the following drilling fluids: the drilling fluid containing the biodegradable polysaccharide in an amount of 2.5 g/L and the biodegradable fibers with an average fiber length of 15 mm in an amount of 0 g/L (Comparative Example 1-1); the drilling fluid containing the biodegradable polysaccharide in an amount of 2.5 g/L and the biodegradable fibers with an average fiber length of 15 mm in an amount of 0.5 g/L (Example 1-1); and the drilling fluid containing the biodegradable polysaccharide in an amount of 2.5 g/L and the biodegradable fibers with an average fiber length of 15 mm in an amount of 1.0 g/L (Example 1-2), the graph having a vertical axis representing the viscosity (mPa·s) and a horizontal axis representing the shear rate (1/s).

DESCRIPTION OF EMBODIMENTS

Drilling Fluid

A drilling fluid according to the present disclosure is a drilling fluid containing water, biodegradable fibers, and a thickener. The thickener contains a biodegradable polysaccharide. The content of the biodegradable polysaccharide in the drilling fluid is greater than or equal to 0.01 g/L and less than or equal to 5 g/L.

(Water)

The water contained in the drilling fluid is not particularly limited. Water contained in a conventionally known aqueous drilling fluid can be used. Examples of the water contained in the drilling fluid include: fresh water; brine such as seawater; tap water; underground water; and any water (e.g., rainwater) that may enter a well when the well is drilled in any of various environments, such as a flat land, mountainous land, river, canal, ocean, etc.

(Biodegradable Fibers)

The biodegradable fibers contained in the drilling fluid are not particularly limited, so long as the fibers are biodegradable. Being biodegradable means being able to be decomposed into low molecular weight compounds by microorganisms in a natural environment. Specifically, being biodegradable or not can be determined based on tests suited for different environments. For example, ISO 14855 (compost) and ISO 14851 (activated sludge) are suited for an aerobic condition, and ISO 14853 (aqueous phase) and ISO 15985 (solid phase) are suited for an anaerobic condition. Biodegradability by microorganisms in seawater can be evaluated by biochemical oxygen demand measurement.

The fibers have structural characteristics of being thin and long. The fibers used in the present disclosure may have a fineness of 100 μm or less. The fiber length of the fibers is determined in relation to the fineness thereof. The fiber length may be greater than or equal to 3 mm.

The fineness of the biodegradable fibers is expressed by denier (D) or dtex. Denier (D) indicates, by a number, the fiber weight per length of 9,000 m in units of grams, and dtex indicates, by a number, the fiber weight per length of 10,000 in in units of grams. The fineness of the biodegradable fibers is preferably greater than or equal to 1 dtex, more preferably greater than or equal to 3 dtex, and yet more preferably greater than or equal to 5 dtex. Also, the fineness of the biodegradable fibers is preferably less than or equal to 100 dtex, more preferably less than or equal to 50 dtex, and yet more preferably less than or equal to 10 dtex.

The fiber length of the biodegradable fibers is preferably less than or equal to 100 mm, more preferably less than or equal to 80 mm, yet more preferably less than or equal to 50 mm, and most preferably less than or equal to 30 mm. Also, the fiber length of the biodegradable fibers is preferably greater than or equal to 3 mm, more preferably greater than or equal to 5 mm, and yet more preferably greater than or equal to 10 mm. Since the fiber length of the biodegradable fibers is within these ranges, the dispersibility of the biodegradable fibers in the drilling fluid is excellent. Excellent dispersibility of the biodegradable fibers contributes to: favorable supporting of the cuttings by interaction between the fibers and by interaction between the fibers and other components; and enhancement of the cuttings transport capability and the hole cleaning capability. It should be noted that, in the present disclosure, the term "cuttings transport" means transporting of the cuttings, and the term "hole cleaning" means favorably transporting the cuttings to outside the well without causing settling and accumulation of the cuttings in the well.

The fineness and the fiber length of the biodegradable fibers can be measured, for example, by a method in which: the diameter and the length of each of 50 to 100 randomly extracted fibers are measured by a fineness measuring device DENICON-DC21 (available from SEARCH CO., LTD.); and an average value of the measured diameters and an average value of the measured lengths are calculated. Therefore, the fineness can be alternatively referred to as an average fiber diameter, and the fiber length can be alternatively referred to as an average fiber length.

Preferably, the biodegradable fibers contained in the drilling fluid are water-insoluble. At least during drilling work, the biodegradable fibers are required to retain their fibrous shape in the drilling fluid.

Examples of the biodegradable fibers include fibers derived from biomass, such as microorganism biomass, plant biomass, and animal biomass. Examples of such biomass-derived fibers include fibers extracted from the biomass and fibers obtained by chemically synthesizing monomers of the biomass.

The biodegradable fibers are, for example, monofilaments or conjugated fibers containing: an aliphatic polyester such as a polyhydroxyalkanoate or polylactic acid; or a polysaccharide such as cellulose. Among these, fibers (monofilaments or conjugated fibers) made of a polyhydroxyalkanoate are preferable as the biodegradable fibers. The reason for this is that since polyhydroxyalkanoates have the most elucidated biodegradation mechanism and have a suitable decomposition rate in the environment, polyhydroxyalkanoates are useful as environmentally harmonious materials.

More preferably, the polyhydroxyalkanoate contains a 3-hydroxyalkanoic acid represented by a general formula (1) below. The reason for this is that containing the 3-hydroxyalkanoic acid represented by the general formula (1) makes it possible to realize both suitable molding processability and favorable biodegradability.

$$[—CHR—CH_2—CO—O—] \quad (1)$$

In the general formula (1), R is an alkyl group represented by $C_pH_{2p+1}$, and p is an integer within a range of 1 to 15.

Most preferably, the polyhydroxyalkanoate is poly(3-hydroxybutyrate-co-3-hydroxyhexanoate). The reason for this is that, in particular, poly(3-hydroxybutyrate-co-3-hydroxyhexanoate) is excellent in biodegradability, environmentally friendly, and realizes excellent cuttings transport capability and excellent hole cleaning capability.

By adding the fibers made of poly(3-hydroxybutyrate-co-3-hydroxyhexanoate) to the drilling fluid, the viscosity (and the shear stress) of the drilling fluid in a low shear rate region can be increased while keeping low the viscosity of (i.e., while keeping the fluidity of) the drilling fluid in a high shear rate region, such as the vicinity of a drill bit. This makes it possible to sufficiently improve the cuttings transport capability and the hole cleaning capability.

The fibers made of poly(3-hydroxybutyrate-co-3-hydroxyhexanoate) are particularly excellent in biodegradability. Therefore, when the fibers made of poly(3-hydroxybutyrate-co-3-hydroxyhexanoate) are discarded or dumped into the environment, or remain as a residue in the environment, the load on the environment is small. Specifically, for example, when the fibers made of poly(3-hydroxybutyrate-co-3-hydroxyhexanoate) are put in seawater, the fibers are decomposed into water and carbon dioxide by the microorganisms existing in the seawater, and do not remain as a residue in the seawater. Thus, the fibers made of poly(3-hydroxybutyrate-co-3-hydroxyhexanoate) are excellent in terms of seawater decomposition. Therefore, even if the fibers are dumped into the ocean, the load on the environment is small.

The content of the biodegradable fibers in the drilling fluid is not particularly limited. The content of the biodegradable fibers in the drilling fluid may be, relative to 100 parts by weight of the below-described thickener, greater than or equal to 5 parts by weight and less than or equal to 500 parts by weight, greater than or equal to 10 parts by weight and less than or equal to 500 parts by weight, greater than or equal to 10 parts by weight and less than or equal to 100 parts by weight, greater than or equal to 15 parts by weight and less than or equal to 50 parts by weight, or greater than or equal to 20 parts by weight and less than or equal to 40 parts by weight. Since the content of the biodegradable fibers in the drilling fluid relative to the thickener is within these ranges, the dispersibility of the biodegradable fibers in the drilling fluid is excellent. Excellent dispersibility of the biodegradable fibers contributes to: favorable supporting of the cuttings by interaction between the fibers and by interaction between the fibers and other components; and enhancement of the cuttings transport capability and the hole cleaning capability.

The content of the biodegradable fibers in the drilling fluid is preferably greater than or equal to 0.1 g/L and less than or equal to 20 g/L, more preferably greater than or equal to 0.2 g/L and less than or equal to 15 g/L, yet more preferably greater than or equal to 0.4 g/L and less than or equal to 10 g/L, and most preferably greater than or equal to 0.5 g/L and less than or equal to 5 g/L. Since the content of the biodegradable fibers in the drilling fluid is within these ranges, the dispersibility of the biodegradable fibers in the drilling fluid is excellent.

(Thickener)

The thickener is not particularly limited, so long as it contains a biodegradable polysaccharide and serves to increase the viscosity of the drilling fluid when added to the drilling fluid.

The content of the biodegradable polysaccharide in the drilling fluid is greater than or equal to 0.01 g/L and less than or equal to 5 g/L.

The thickener may be the biodegradable polysaccharide, and may contain other components in addition to the biodegradable polysaccharide. The other components to be contained in addition to the biodegradable polysaccharide are, for example, an inorganic mineral and an organic colloid (polymer). Examples of the inorganic mineral include bentonite and sepiolite, and examples of the organic colloid (polymer) include a PHPA (Partially Hydrolyzed Poly Acrylamide) polymer that contains polyacrylamide and a copolymer of acrylamide and acrylic acid. One example of a commercially available product of bentonite is "TELGEL" (available from TELNITE CO., LTD.). One example of a commercially available product of sepiolite is "THERMOGEL" (available from TELNITE CO., LTD.). One example of a commercially available product of the PHPA (Partially Hydrolyzed Poly Acrylamide) polymer is "TELCOAT" (available from TELNITE CO., LTD.).

The thickener is, if it is made solely of the biodegradable polysaccharide, excellent particularly in biodegradability and does not remain as a residue in the environment, causing the least load on the environment. For this reason, the thickener made solely of the biodegradable polysaccharide is preferable.

The content of the inorganic mineral in the drilling fluid may be greater than or equal to 0.01 g/L, greater than or equal to 1 g/L, greater than or equal to 10 g/L, greater than or equal to 20 g/L, or greater than or equal to 30 g/L. Also, the content of the inorganic mineral in the drilling fluid may be less than or equal to 100 g/L, less than or equal to 80 g/L, or less than or equal to 60 g/L.

The content of the organic colloid (polymer) in the drilling fluid may be greater than or equal to 0.01 g/L, greater than or equal to 0.5 g/L, or greater than or equal to 1 g/L. Also, the content of the organic colloid (polymer) in the drilling fluid may be less than or equal to 10 g/L, less than or equal to 5 g/L, or less than or equal to 3 g/L.

The content of the biodegradable polysaccharide in the drilling fluid is greater than or equal to 0.01 g/L and less than or equal to 5 g/L. Preferably, the content of the biodegradable polysaccharide in the drilling fluid is greater than or equal to 0.01 g/L and less than 5 g/L, more preferably greater than or equal to 0.05 g/L and less than or equal to 4 g/L, and yet more preferably greater than or equal to 0.1 g/L and less than or equal to 3 g/L. In a case where the content of the biodegradable polysaccharide in the drilling fluid is less than 0.01 g/L, the dispersibility of the biodegradable fibers in the drilling fluid is poor. On the other hand, in a case where the content of the biodegradable polysaccharide in the drilling fluid is greater than 5 g/L, the viscosity (and the shear stress) of the drilling fluid in the low shear rate region cannot be increased by blending the biodegradable fibers in the drilling fluid, and the cuttings transport and the hole cleaning cannot be performed efficiently.

The biodegradable polysaccharide is not particularly limited, so long as it is a biodegradable and water-soluble polysaccharide that serves to increase the viscosity of the drilling fluid when added to the drilling fluid.

In the description herein, a polysaccharide being "water-soluble" means that when the polysaccharide is dissolved in water under its suitable dissolution condition (e.g., a dissolution temperature, a concentration, or a stirring time), the polysaccharide is dissolved in the water without retaining its shape and without leaving a residue. At least during drilling work, the biodegradable polysaccharide needs to be dissolved in the drilling fluid.

Examples of the biodegradable polysaccharide include: cellulose derivatives such as carboxymethyl cellulose and polyanionic cellulose; glucosamine such as chitosan; xanthan gum; and guar gum. Among these, at least one selected from the group consisting of carboxymethyl cellulose, polyanionic cellulose, xanthan gum, and guar gum is preferably used. For example, guar gum is most superior in terms of viscosity and moisture retention under a low-temperature condition. Carboxymethyl cellulose has excellent viscosity, and is inexpensive. Polyanionic cellulose has excellent viscosity, and is highly salt tolerant. Xanthan gum exhibits a high viscosity in a small amount, and is shear thinning (i.e., the higher the shear rate, the lower the viscosity). Any of these polysaccharides can be suitably selected in consideration of various factors, such as the environment of the drilled well, drilling conditions, and availability of these polysaccharides in the market.

The weight-average molecular weight of the biodegradable polysaccharide is preferably greater than or equal to 200,000. The weight-average molecular weight of the biodegradable polysaccharide may be less than or equal to 1,000,000.

(Optional Components)

In addition to the water, the biodegradable fibers, and the thickener, the drilling fluid of the present disclosure may further contain, within the scope of the object of the present invention, optional components other than water, biodegradable fibers, and thickeners.

Examples of the optional components other than water, biodegradable fibers, and thickeners include: weighting agents such as baryte; dispersants such as lignosulfonic acid derivatives and humic acids; mudstone hydration and swelling inhibitors such as KCl (potassium chloride); fluid loss additives; mud cake toughening agents; lubricants; surfactants; and pH control agents such as caustic soda.

The drilling fluid of the present disclosure is such that the viscosity (and the shear stress) of the drilling fluid can be kept high in the low shear rate region, and the viscosity (and the shear stress) of the drilling fluid can be kept low in the high shear rate region. Therefore, the drilling fluid of the present disclosure has excellent cuttings transport capability and excellent hole cleaning capability. The drilling fluid of the present disclosure is also expected to reduce friction between the drill pipe and the cuttings as well as between the inner wall of the well and the cuttings. In addition, as described above, the load on the environment caused by the drilling fluid of the present disclosure is small, and therefore, the disposal of the drilling fluid is easy.

The rheological properties of the drilling fluid of the present disclosure can be approximated by a power law (also referred to as a power-law model), which is a general flow equation for a non-Newtonian fluid.

The Bingham plastic model is one of the typical rheology models representing the rheological properties of a drilling fluid, and is written as an equation (1) shown below.

[Math. 1]

$$\tau = \tau_y + \mu_p \dot{\gamma}, \tag{1}$$

where
  $\tau$ is the shear stress (Pa), and
  $\dot{\gamma}$ it is the shear rate (s$^{-1}$)

In the equation (1), $\mu_p$ is a plastic viscosity and $\tau_y$ is a yield value, which are in general referred to as PV (plastic viscosity) and YP (yield point), respectively, in the petroleum industry.

A power law (also referred to as a power-law model), which is another typical rheology model, is written as an equation (2) shown below.

[Math. 2]

$$\tau = K\dot{\gamma}^n, \tag{2}$$

where
  $\tau$ is the shear stress (Pa), and
  $\dot{\gamma}$ is the shear rate (s$^{-1}$).

In the equation (2), n is a power index, and K is a consistency index.

On the other hand, the Herschel-Bulkley model (modified power law model) is a model having the yield stress $\tau_y$ corresponding to the YP of the Bingham plastic model, and is written as an equation (3) shown below.

[Math. 3]

$$\tau = \tau_y + K\dot{\gamma}^n, \tag{3}$$

where
  $\tau$ is the shear stress (Pa), and
  $\dot{\gamma}$ is the shear rate (s$^{-1}$).

The Herschel-Bulkley model is a model that has combined characteristics, i.e., intermediate characteristics, between the Bingham plastic model and the power-law model. When n=1, the Herschel-Bulkley model is equivalent to the Bingham plastic model. When $\tau_y$=0, the Herschel-Bulkley model is equivalent to the power law (power-law model).

In the equation (2) representing the power law (power-law model), the more the n value is close to 0 and the greater the K value, the higher the viscosity of the drilling fluid in the low shear rate region and the lower the viscosity of the drilling fluid in the high shear rate region, which can be evaluated as excellent in terms of cuttings transport capability and hole cleaning capability.

Drilling Method

A drilling method of the present disclosure includes drilling a well while feeding a drilling fluid into the well, and discharging cuttings that are produced by the drilling to outside the well. The drilling fluid contains water, biodegradable fibers, and a thickener. The thickener contains a biodegradable polysaccharide. A content of the biodegradable polysaccharide in the drilling fluid is greater than or equal to 0.01 g/L and less than or equal to 5 g/L.

Hereinafter, a description is given of the step of drilling a well while feeding a drilling fluid into the well, and discharging cuttings that are produced by the drilling to outside the well.

One specific example of a method of drilling the well includes: inserting a drill pipe including a drill bit into the well, the drill bit being provided on the distal end of the drill pipe; and crushing or grinding a stratum with the drill bit.

One specific example of a method of feeding the drilling fluid into the well includes: pressure-feeding the drilling fluid inside the drill pipe; and jetting out the drilling fluid from the drill bit provided on the distal end of the drill pipe.

One specific example of a method of discharging the cuttings produced by the drilling to outside the well includes: transporting the cuttings together with the drilling fluid though an annulus outside the drill pipe to a ground surface outside the well. As previously described, the annulus is a region outside the drill pipe, the region allowing the drilling fluid to flow therein. For example, in a case where a double-pipe structure is formed by the drill pipe and a casing pipe provided outside the drill pipe, or by the drill pipe and a riser pipe provided outside the drill pipe, or by the drill pipe and the stratum on the wall surface of the well, the annulus is formed by the drill pipe and the casing pipe, or by the drill pipe and the riser pipe, or by the drill pipe and the stratum on the wall surface of the well.

After the drilling fluid has been transported to outside the well together with the cuttings, the drilling fluid may be recovered, and the cuttings may be removed from the recovered drilling fluid; then, the components of the drilling fluid may be adjusted as necessary; and thereafter, the drilling fluid whose components have been adjusted may be fed into the well to be used again for the drilling. In this case, the drilling fluid circulates through the inside of the drill pipe, the drill bit, the annulus, and cuttings removal equipment.

In a marine environment, a pipe that connects between a seabed surface and offshore drilling equipment in order to form an annulus through which the drilling fluid flows together with the cuttings is called a riser pipe. Drilling using the riser pipe is called riser drilling.

Riser drilling has various advantages. For example, in a marine environment, riser drilling makes it possible to recover the drilling fluid together with the cuttings. Moreover, in riser drilling, the well is not damaged easily, which makes deeper drilling possible, and also, the adjustment of the internal pressure of the well is easy. A blowout preventer (BOP) may be installed at the top of the well, i.e., at the wellhead, in order to prevent the blowout of objects from the inside of the well due to pressure increase in the well.

In a case where the drilling fluid that has been transported to outside the well together with the cuttings is not to be recovered, riserless drilling can be used. Riserless drilling does not use the riser pipe. In riserless drilling, by feeding the drilling fluid into the well, the cuttings produced by the drilling can be discharged to outside the well. The discharged cuttings are not recovered, but discarded into the seawater. Riserless drilling has various advantages. For example, riserless drilling is more suitable for shallow drilling than riser drilling, and riserless drilling makes it possible to perform drilling at a large number of sites within a short period of time.

The drilling fluid used in the drilling method of the present disclosure contains the water, the biodegradable fibers, and the thickener as previously described in detail.

Thus, the drilling method of the present disclosure uses the environmentally friendly drilling fluid that has excellent cuttings transport capability and excellent hole cleaning capability. Therefore, by applying the drilling method of the present disclosure to riserless drilling, in which the drilling fluid that has been transported to outside the well together with the cuttings is not recovered, but discarded into the environment, the cuttings transport and the hole cleaning can be performed more efficiently, and the load on the environment can be reduced significantly, as compared to conventional drilling methods.

As described above, the drilling method of the present disclosure is suitable for both riser drilling and riserless drilling.

The environment in which the drilling method of the present disclosure is used is not particularly limited. The drilling method of the present disclosure can be used in any of various environments, such as a flat land, mountainous land, river, canal, ocean, etc. The drilling method of the present disclosure can be suitably used in a marine environment, in which reduction of the load on the environment is particularly required. The drilling method of the present disclosure can also be used for geothermal well drilling. However, a geothermal stratum has a much higher temperature and a lower pressure than an oil stratum and a natural gas stratum. For this reason, in a case where the drilling method of the present disclosure is used for geothermal well drilling, it is necessary to avoid blending the drilling fluid with a component that is weak against heat.

EXAMPLES

Hereinafter, the present invention is described in further detail with reference to Examples. However, the present invention is not limited in any way by these Examples.

Experiment 1

(Base Fluid Containing a Thickener)

A polyanionic cellulosic polymer (TEL-POLYMER H (major component: a polyanionic cellulosic polymer) available from TELNITE CO., LTD.) was put in tap water as the biodegradable polysaccharide, which was sufficiently stirred by a household blender such that the polyanionic cellulosic polymer was dissolved in the tap water. In this manner, a base fluid having a biodegradable polysaccharide concentration of 2.5 g/L, a base fluid having a biodegradable polysaccharide concentration of 5.0 g/L, and a base fluid having a biodegradable polysaccharide concentration of 7.5 g/L were prepared.

(Biodegradable Fibers)

Fibers made of poly(3-hydroxybutyrate-co-3-hydroxyhexanoate) were cut, and thereby the fibers having an average fiber length of 5 mm, the fibers having an average fiber length of 15 mm, and the fibers having an average fiber length of 30 mm were each prepared as the biodegradable fibers.

The fibers made of poly(3-hydroxybutyrate-co-3-hydroxyhexanoate) have a fineness of 10.0 dtex, a tensile strength of 1.3 cN/dtex, an elongation of 70.0%, and a Young's modulus of 2.2 Gpa.

(Drilling Fluid)

The biodegradable fibers were put in each base fluid, and stirred sufficiently by a household blender in the same manner as above. In this way, samples each having a biodegradable fiber concentration and a biodegradable polysaccharide concentration as shown in Tables 1 to 3 were prepared.

TABLE 1

| | Biodegradable polysaccharide concentration (g/L) | Biodegradable fiber concentration (g/L) (Average fiber length: 15 mm) |
|---|---|---|
| Comp. Ex. 1-1 | 2.5 | 0.0 |
| Ex. 1-1 | 2.5 | 0.5 |
| Ex. 1-2 | 2.5 | 1.0 |
| Comp. Ex. 2-1 | 5.0 | 0.0 |
| Ex. 2-1 | 5.0 | 0.5 |
| Ex. 2-2 | 5.0 | 1.0 |
| Comp. Ex. 3-1 | 7.5 | 0.0 |
| Comp. Ex. 3-2 | 7.5 | 0.5 |
| Comp. Ex. 3-3 | 7.5 | 1.0 |

TABLE 2

| | Biodegradable polysaccharide concentration (g/L) | Biodegradable fiber concentration (g/L) (Average fiber length: 5 mm) |
|---|---|---|
| Ex. 4-1 | 2.5 | 0.5 |
| Ex. 4-2 | 2.5 | 1.0 |
| Comp. Ex. 5-1 | 7.5 | 0.5 |
| Comp. Ex. 5-2 | 7.5 | 1.0 |

TABLE 3

| | Biodegradable polysaccharide concentration (g/L) | Biodegradable fiber concentration (g/L) (Average fiber length: 30 mm) |
|---|---|---|
| Ex. 6-1 | 2.5 | 0.5 |
| Ex. 6-2 | 2.5 | 1.0 |

(Evaluation of Dispersibility)

The biodegradable fibers were mixed into each of the base fluids, which were then left stand for 12 hours or longer. Thereafter, evaluation of the dispersibility of the biodegradable fibers in these resulting drilling fluids was performed. The drilling fluids were observed with naked eyes. Those in which the entire biodegradable fibers were either gathered and settled at the bottom or gathered and floating were evaluated as having poor dispersibility, and those in which the entire biodegradable fibers were neither gathered and settled at the bottom nor gathered and floating were evaluated as having excellent dispersibility.

The evaluation results were such that the higher the biodegradable fiber concentration and the thickener concentration, the better the dispersibility of the biodegradable fibers, and such that the greater the length of the biodegradable fibers, the better the dispersibility of the biodegradable fibers.

(Evaluation of Rheological Properties)

A V-G meter (Model 35, available from Fann Instrument Company), which is a coaxial cylinder rotational viscometer, was used to measure the shear stress and the viscosity of each drilling fluid at different shear rates at room temperature in accordance with a standard drilling fluid testing method API RP13B (ISO 10414-1:2008) in compliance with the API (American Petroleum Institute) standard. Evaluation of the rheological properties of each drilling fluid was made based on the measured shear stress and viscosity. The rheological properties were evaluated based on n and K values when approximated by the power law (power-law model) of the above equation (2), which is a general flow equation for a non-Newtonian fluid. The n and K values were obtained in accordance with the API RP13B standard for separate cases, i.e., a case where the shear rate was 511 (1/s) or higher and a case where the shear rate was 340 (1/s) or lower. Tables 4 to 6 show measurement results of the drilling fluids in which the biodegradable fibers having an average fiber length of 15 mm were used. Tables 7 and 8 show measurement results of the drilling fluids in which the biodegradable fibers having an average fiber length of 5 mm were used. Table 9 shows measurement results of the drilling fluids in which the biodegradable fibers having an average fiber length of 30 mm were used.

Figure 1:
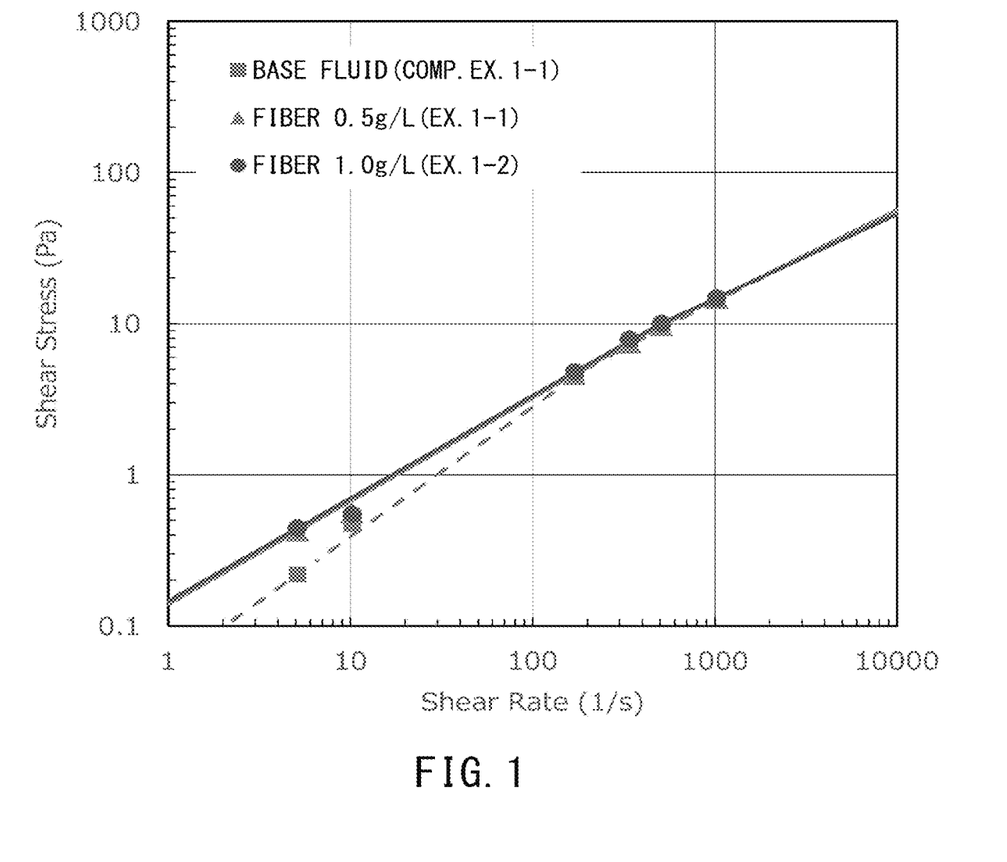
Figure 2:
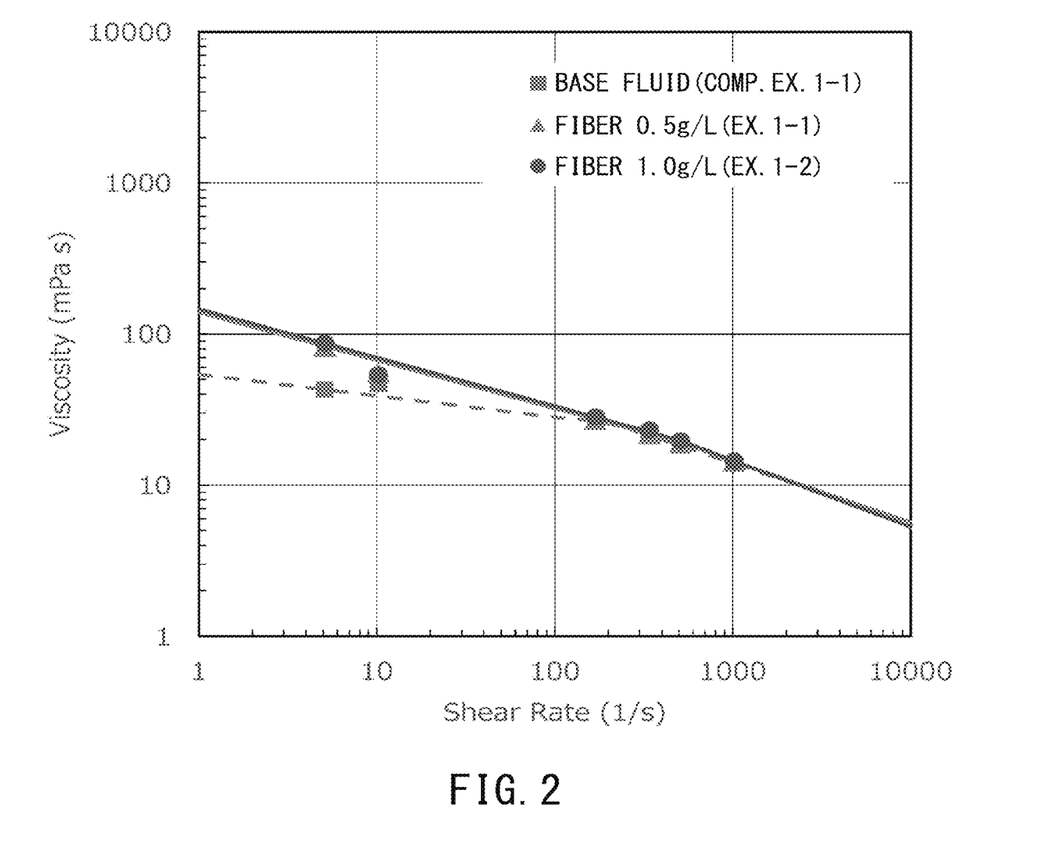

FIG. 1 and FIG. 2 show results of plotting the shear stress (Pa) at each shear rate and the viscosity (mPa·s) at each shear rate on respective double logarithmic graphs regarding the following drilling fluids: the drilling fluid containing the biodegradable polysaccharide in an amount of 2.5 g/L and the biodegradable fibers with an average fiber length of 15 mm in an amount of 0 g/L (Comparative Example 1-1); the drilling fluid containing the biodegradable polysaccharide in an amount of 2.5 g/L and the biodegradable fibers with an average fiber length of 15 mm in an amount of 0.5 g/L (Example 1-1); and the drilling fluid containing the biodegradable polysaccharide in an amount of 2.5 g/L and the biodegradable fibers with an average fiber length of 15 mm in an amount of 1.0 g/L (Example 1-2). Each of FIG. 1 and FIG. 2 also shows an approximation straight line when the results are approximated by the power law (power-law model) of the above equation (2).

TABLE 4

| | Comparative Example 1-1 | | | | Example 1-1 | | | | Example 1-2 | | | |
|---|---|---|---|---|---|---|---|---|---|---|---|---|
| Shear rate (1/s) | Shear stress (Pa) | Viscosity (mPa·s) | n value | K value (mPa s$^n$) | Shear stress (Pa) | Viscosity (mPa·s) | n value | K value (mPa s$^n$) | Shear stress (Pa) | Viscosity (mPa·s) | n value | K value (mPa s$^n$) |
| 5.11 | 0.22 | 43.00 | 0.858 | 54.1 | 0.42 | 83.00 | 0.682 | 139.2 | 0.44 | 87.00 | 0.679 | 146.6 |
| 10.21 | 0.47 | 46.50 | | | 0.56 | 55.00 | | | 0.55 | 53.50 | | |
| 170.23 | 4.44 | 26.10 | | | 4.63 | 27.21 | | | 4.80 | 28.20 | | |
| 340.46 | 7.16 | 21.04 | | | 7.47 | 21.94 | | | 7.88 | 23.14 | | |
| 510.69 | 9.31 | 18.23 | 0.605 | 214.3 | 9.70 | 19.00 | 0.593 | 240.1 | 10.01 | 19.60 | 0.560 | 304.9 |
| 1021.38 | 14.16 | 13.86 | | | 14.64 | 14.33 | | | 14.76 | 14.45 | | |

TABLE 5

| | Comparative Example 2-1 | | | | Example 2-1 | | | | Example 2-2 | | | |
|---|---|---|---|---|---|---|---|---|---|---|---|---|
| Shear rate (1/s) | Shear stress (Pa) | Viscosity (mPa·s) | n value | K value (mPa s$^n$) | Shear stress (Pa) | Viscosity (mPa·s) | n value | K value (mPa s$^n$) | Shear stress (Pa) | Viscosity (mPa·s) | n value | K value (mPa s$^n$) |
| 5.11 | 0.70 | 137.00 | 0.722 | 198.4 | 0.75 | 147.00 | 0.751 | 220.1 | 0.87 | 170.00 | 0.715 | 270.4 |
| 10.21 | 1.23 | 120.00 | | | 1.29 | 126.50 | | | 1.47 | 143.50 | | |
| 170.23 | 10.47 | 61.50 | | | 10.45 | 61.41 | | | 10.62 | 62.40 | | |
| 340.46 | 15.90 | 46.69 | | | 15.90 | 46.69 | | | 16.20 | 47.59 | | |
| 510.69 | 19.95 | 39.07 | 0.510 | 832.1 | 19.98 | 39.13 | 0.512 | 822.1 | 20.39 | 39.93 | 0.509 | 853.7 |
| 1021.38 | 28.41 | 27.81 | | | 28.50 | 27.90 | | | 29.02 | 28.41 | | |

TABLE 6

| | Comparative Example 3-1 | | | | Comparative Example 3-2 | | | | Comparative Example 3-3 | | | |
|---|---|---|---|---|---|---|---|---|---|---|---|---|
| Shear rate (1/s) | Shear stress (Pa) | Viscosity (mPa·s) | n value | K value (mPa s$^n$) | Shear stress (Pa) | Viscosity (mPa·s) | n value | K value (mPa s$^n$) | Shear stress (Pa) | Viscosity (mPa·s) | n value | K value (mPa s$^n$) |
| 5.11 | 1.53 | 299.99 | 0.732 | 463.7 | 1.53 | 299.99 | 0.723 | 470.7 | 1.55 | 302.99 | 0.724 | 474.7 |
| 10.21 | 2.77 | 271.49 | | | 2.77 | 271.49 | | | 2.91 | 284.99 | | |
| 170.23 | 19.93 | 117.09 | | | 19.30 | 113.40 | | | 19.56 | 114.90 | | |
| 340.46 | 28.80 | 84.60 | | | 28.05 | 82.39 | | | 28.53 | 83.80 | | |
| 510.69 | 35.13 | 68.80 | 0.446 | 2171.0 | 34.28 | 67.13 | 0.453 | 2029.6 | 34.92 | 68.37 | 0.453 | 2066.7 |
| 1021.38 | 47.89 | 46.88 | | | 46.95 | 45.96 | | | 47.81 | 46.81 | | |

TABLE 7

| | Comparative Example 1-1 | | | | Example 4-1 | | | | Example 4-2 | | | |
|---|---|---|---|---|---|---|---|---|---|---|---|---|
| Shear rate (1/s) | Shear stress (Pa) | Viscosity (mPa·s) | n value | K value (mPa s$^n$) | Shear stress (Pa) | Viscosity (mPa·s) | n value | K value (mPa s$^n$) | Shear stress (Pa) | Viscosity (mPa·s) | n value | K value (mPa s$^n$) |
| 5.11 | 0.22 | 43.00 | 0.858 | 54.1 | 0.47 | 93.00 | 0.669 | 159.3 | 0.44 | 87.00 | 0.690 | 144.0 |
| 10.21 | 0.47 | 46.50 | | | 0.61 | 60.00 | | | 0.68 | 66.50 | | |
| 170.23 | 4.44 | 26.10 | | | 4.95 | 29.10 | | | 4.99 | 29.31 | | |
| 340.46 | 7.16 | 21.04 | | | 7.93 | 23.29 | | | 8.08 | 23.74 | | |

TABLE 7-continued

| | Comparative Example 1-1 | | | | Example 4-1 | | | | Example 4-2 | | | |
|---|---|---|---|---|---|---|---|---|---|---|---|---|
| Shear rate (1/s) | Shear stress (Pa) | Viscosity (mPa·s) | n value | K value (mPa s″) | Shear stress (Pa) | Viscosity (mPa·s) | n value | K value (mPa s″) | Shear stress (Pa) | Viscosity (mPa·s) | n value | K value (mPa s″) |
| 510.69 | 9.31 | 18.23 | 0.605 | 214.3 | 10.28 | 20.13 | 0.624 | 210.0 | 10.47 | 20.50 | 0.638 | 196.5 |
| 1021.38 | 14.16 | 13.86 | | | 15.85 | 15.51 | | | 16.29 | 15.95 | | |

TABLE 8

| | Comparative Example 3-1 | | | | Comparative Example 5-1 | | | | Comparative Example 5-2 | | | |
|---|---|---|---|---|---|---|---|---|---|---|---|---|
| Shear rate (1/s) | Shear stress (Pa) | Viscosity (mPa·s) | n value | K value (mPa s″) | Shear stress (Pa) | Viscosity (mPa·s) | n value | K value (mPa s″) | Shear stress (Pa) | Viscosity (mPa·s) | n value | K value (mPa s″) |
| 5.11 | 1.53 | 299.99 | 0.732 | 463.7 | 1.53 | 299.99 | 0.722 | 471.4 | 1.74 | 339.99 | 0.704 | 550.6 |
| 10.21 | 2.77 | 271.49 | | | 2.62 | 256.49 | | | 3.03 | 296.49 | | |
| 170.23 | 19.93 | 117.09 | | | 19.24 | 113.01 | | | 20.44 | 120.09 | | |
| 340.46 | 28.80 | 84.60 | | | 28.00 | 82.24 | | | 29.67 | 87.15 | | |
| 510.69 | 35.13 | 68.80 | 0.446 | 2171.0 | 34.51 | 67.57 | 0.472 | 1819.9 | 36.34 | 71.17 | 0.458 | 2085.9 |
| 1021.38 | 47.89 | 46.88 | | | 47.87 | 46.86 | | | 49.94 | 48.90 | | |

TABLE 9

| | Comparative Example 1-1 | | | | Example 6-1 | | | | Example 6-2 | | | |
|---|---|---|---|---|---|---|---|---|---|---|---|---|
| Shear rate (1/s) | Shear stress (Pa) | Viscosity (mPa·s) | n value | K value (mPa s″) | Shear stress (Pa) | Viscosity (mPa·s) | n value | K value (mPa s″) | Shear stress (Pa) | Viscosity (mPa·s) | n value | K value (mPa s″) |
| 5.11 | 0.22 | 43.00 | 0.858 | 54.1 | 0.51 | 100.00 | 0.665 | 172.6 | 0.46 | 90.00 | 0.698 | 147.0 |
| 10.21 | 0.47 | 46.50 | | | 0.70 | 68.50 | | | 0.71 | 70.00 | | |
| 170.23 | 4.44 | 26.10 | | | 5.24 | 30.81 | | | 5.31 | 31.20 | | |
| 340.46 | 7.16 | 21.04 | 0.605 | 214.3 | 8.16 | 23.95 | 0.592 | 257.6 | 8.68 | 25.50 | 0.564 | 312.9 |
| 510.69 | 9.31 | 18.23 | | | 10.33 | 20.23 | | | 10.56 | 20.67 | | |
| 1021.38 | 14.16 | 13.86 | | | 15.58 | 15.25 | | | 15.61 | 15.28 | | |

The drilling fluids of the Examples each exhibited a higher shear stress and a higher viscosity than those of the base fluids of the Comparative Examples at the shear rates of 5.11 and 10.21 (1/s), which are low shear rate regions, while maintaining a similar shear stress and a similar viscosity to those of the base fluids of the Comparative Examples at the shear rates of 170.23, 340.46, 510.69, and 1021.38 (1/s), which are high shear rate regions.

Also, behavior exhibited at the shear rates of 5.11 and 10.21 (1/s) and behavior exhibited at the shear rates of 170.23, 340.46, 510.69, and 1021.38 (1/s) were different from each other (i.e., the slope of an approximation straight line corresponding to the shear rates of 5.11 and 10.21 (1/s) and the slope of an approximation straight line corresponding to the shear rates of 170.23, 340.46, 510.69, and 1021.38 (1/s) were different from each other) (see FIG. 1 and FIG. 2). Thus, it can be clearly understood from the shapes in these graphs that, among non-Newtonian fluid properties, pseudoplastic properties that are considered as useful drilling fluid properties are achieved effectively (see "Reoroji Youron 1968" (Summary of Rheology 1968), authored by Shigeji Onogi).

The above indicates that in a case where well drilling is performed with a drill pipe by actually using the drilling fluid of any of the Examples, the viscosity (and the shear stress) of the drilling fluid in the low shear rate region can be increased while keeping low the viscosity of (i.e., while keeping the fluidity of) the drilling fluid in the high shear rate region, such as the vicinity of the drill bit. That is, the drilling fluids of the Examples exhibit excellent cuttings transport capability and excellent hole cleaning capability.

On the other hand, blending the biodegradable fibers in the drilling fluids of the Comparative Examples did not cause changes in their shear stress and viscosity in both the high and low shear rate regions. In other words, blending the biodegradable fibers in the drilling fluids of the Comparative Examples caused substantially no influence on the rheological properties.

Experiment 2

(Base Fluid Containing a Thickener)

A polyanionic cellulosic polymer (TEL-POLYMER H (major component: a polyanionic cellulosic polymer) available from TELNITE CO., LTD.) was put in water as the biodegradable polysaccharide, which was sufficiently stirred by a blender available from Hamilton Beach Brands, Inc., i.e., a blender commonly used for preparing a drilling fluid for testing, such that the polyanionic cellulosic polymer was dissolved in the water. In this manner, a base fluid having a biodegradable polysaccharide concentration of 0.00 g/L and a base fluid having a biodegradable polysaccharide concentration of 1.0 g/L were prepared.

(Biodegradable Fibers)

Fibers made of poly(3-hydroxybutyrate-co-3-hydroxyhexanoate) were cut, and thereby the fibers having an average fiber length of 14 mm were prepared as the biodegradable fibers.

The fibers made of poly(3-hydroxybutyrate-co-3-hydroxyhexanoate) have a fineness of 10.1 dtex, a tensile strength of 1.01 cN/dtex, an elongation of 95.2%, and a Young's modulus of 2.0 Gpa.

(Drilling Fluid)

The biodegradable fibers were put in each base fluid, and stirred sufficiently by a blender available from Hamilton Beach Brands, Inc. in the same manner as above. In this way, samples each having a biodegradable fiber concentration and a biodegradable polysaccharide concentration as shown in Table 10 were prepared.

TABLE 10

|  | Biodegradable polysaccharide concentration (g/L) | Biodegradable fiber concentration (g/L) | Average fiber length (mm) |
|---|---|---|---|
| Comp. Ex. A-1 | 0.00 | 0.00 | — |
| Comp. Ex. A-2 | 1.00 | 0.00 | — |
| Comp. Ex. A-3 | 0.00 | 1.00 | 14 |
| Ex. A-1 | 1.00 | 1.00 | 14 |

(Evaluation of Rheological Properties)

A V-G meter (Model 35, available from Fann Instrument Company), which is a coaxial cylinder rotational viscometer, was used to measure the shear stress and the viscosity of each sample drilling fluid at different shear rates at room temperature in accordance with a standard drilling fluid testing method API RP13B (ISO 10414-1:2008) in compliance with the API (American Petroleum Institute) standard. Evaluation of the rheological properties of each drilling fluid was made based on the measured shear stress and viscosity. The rheological properties were evaluated based on n and K values when approximated by the power law (power-law model) of the above equation (2), which is a general flow equation for a non-Newtonian fluid. The n and K values were obtained in accordance with the API RP13B standard for separate cases, i.e., a case where the shear rate was 511 (1/s) or higher and a case where the shear rate was 340 (1/s) or lower. The measurement results are shown in Table 11.

Figure 3:
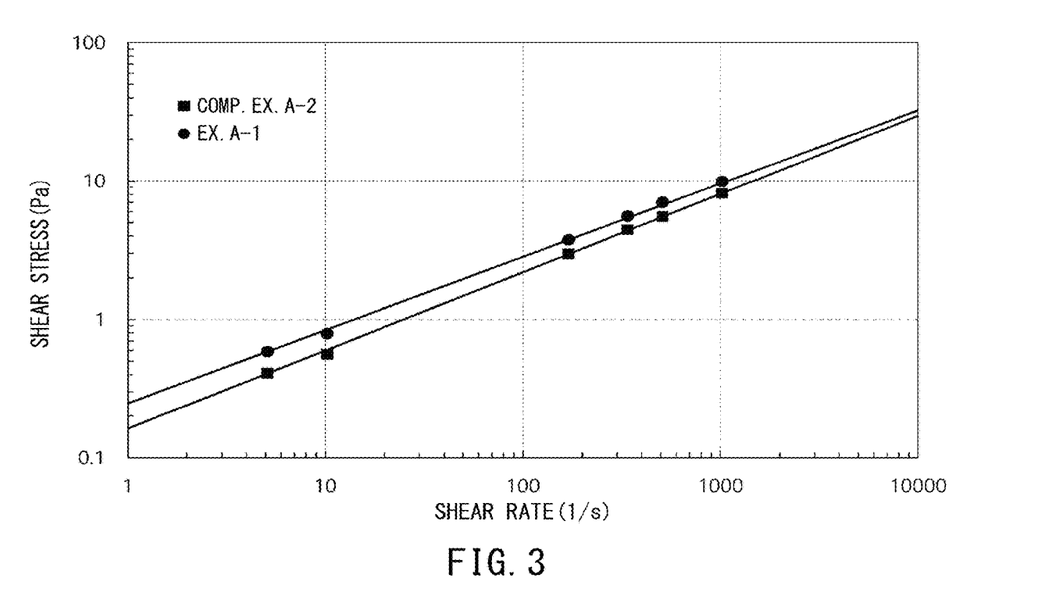
FIG. 3 shows results of plotting a shear stress at each of different shear rates on a double logarithmic graph regarding the following drilling fluids: a drilling fluid containing a biodegradable polysaccharide in an amount of 1.0 g/L and biodegradable fibers with an average fiber length of 14 mm in an amount of 0 g/L (Comparative Example A-2); and a drilling fluid containing the biodegradable polysaccharide in an amount of 1.0 g/L and the biodegradable fibers with an average fiber length of 14 mm in an amount of 1.0 g/L (Example A-1), the graph having a vertical axis representing the shear stress (Pa) and a horizontal axis representing the shear rate (1/s).
Figure 4:
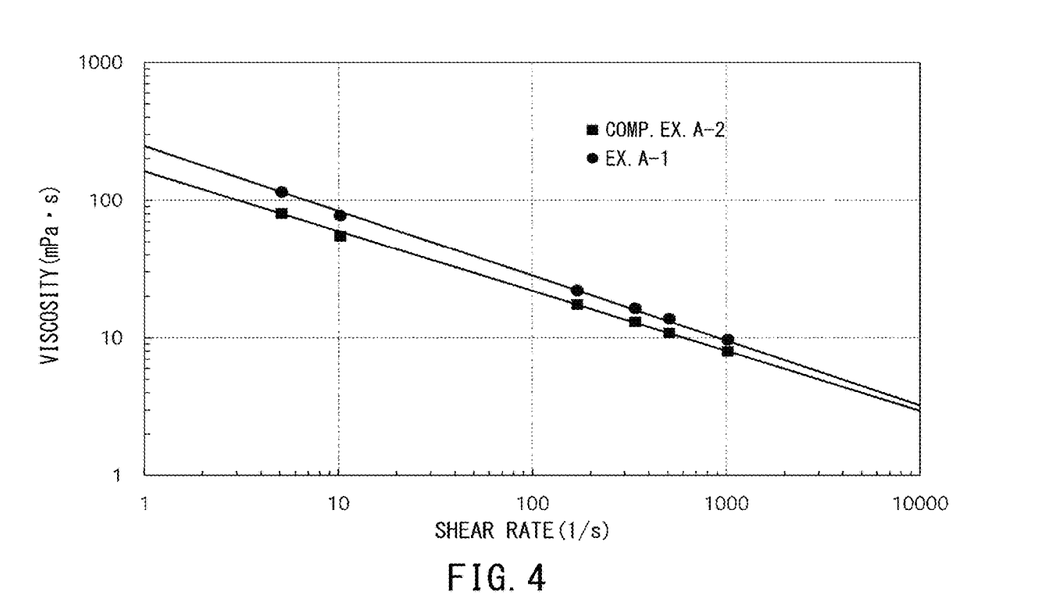
FIG. 4 shows results of plotting a viscosity at each of the different shear rates on a double logarithmic graph regarding the following drilling fluids: the drilling fluid containing the biodegradable polysaccharide in an amount of 1.0 g/L and the biodegradable fibers with an average fiber length of 14 mm in an amount of 0 g/L (Comparative Example A-2); and the drilling fluid containing the biodegradable polysaccharide in an amount of 1.0 g/L and the biodegradable fibers with an average fiber length of 14 mm in an amount of 1.0 g/L (Example A-1), the graph having a vertical axis representing the viscosity (mPa·s) and a horizontal axis representing the shear rate (1/s).

FIG. 3 and FIG. 4 show results of plotting the shear stress (Pa) at each shear rate and the viscosity (mPa·s) at each shear rate on respective double logarithmic graphs.

TABLE 11

| | Comparative Example A-2 | | | | Example A-1 | | | |
|---|---|---|---|---|---|---|---|---|
| Shear rate (1/s) | Shear stress (Pa) | Viscosity (mPa · s) | n value | K value (mPa s$^n$) | Shear stress (Pa) | Viscosity (mPa · s) | n value | K value (mPa s$^n$) |
| 5.11 | 0.41 | 80.00 | 0.565 | 162.4 | 0.59 | 115.00 | 0.529 | 247.5 |
| 10.21 | 0.56 | 55.00 | | | 0.79 | 77.50 | | |
| 170.23 | 2.96 | 17.40 | | | 3.75 | 22.05 | | |
| 340.46 | 4.44 | 13.05 | | | 5.57 | 16.35 | | |
| 510.69 | 5.53 | 10.83 | 0.553 | 175.7 | 7.02 | 13.75 | 0.496 | 317.9 |
| 1021.38 | 8.12 | 7.95 | | | 9.91 | 9.70 | | |

At the shear rates of 5.11 and 10.21 (1/s), which are low shear rate regions, the drilling fluid of Example A-1 exhibited a particularly higher shear stress and a particularly higher viscosity than those of the base fluid of Comparative Example A-2 containing no biodegradable fibers, while maintaining a similar shear stress and a similar viscosity to, or a slightly higher shear stress and a slightly higher viscosity than, those of the base fluid of Comparative Example A-2 at the shear rates of 170.23, 340.46, 510.69, and 1021.38 (1/s), which are high shear rate regions.

(State of Cuttings Transport, Cuttings Behavior, and Speed of Cuttings Transport)

Figure 5:
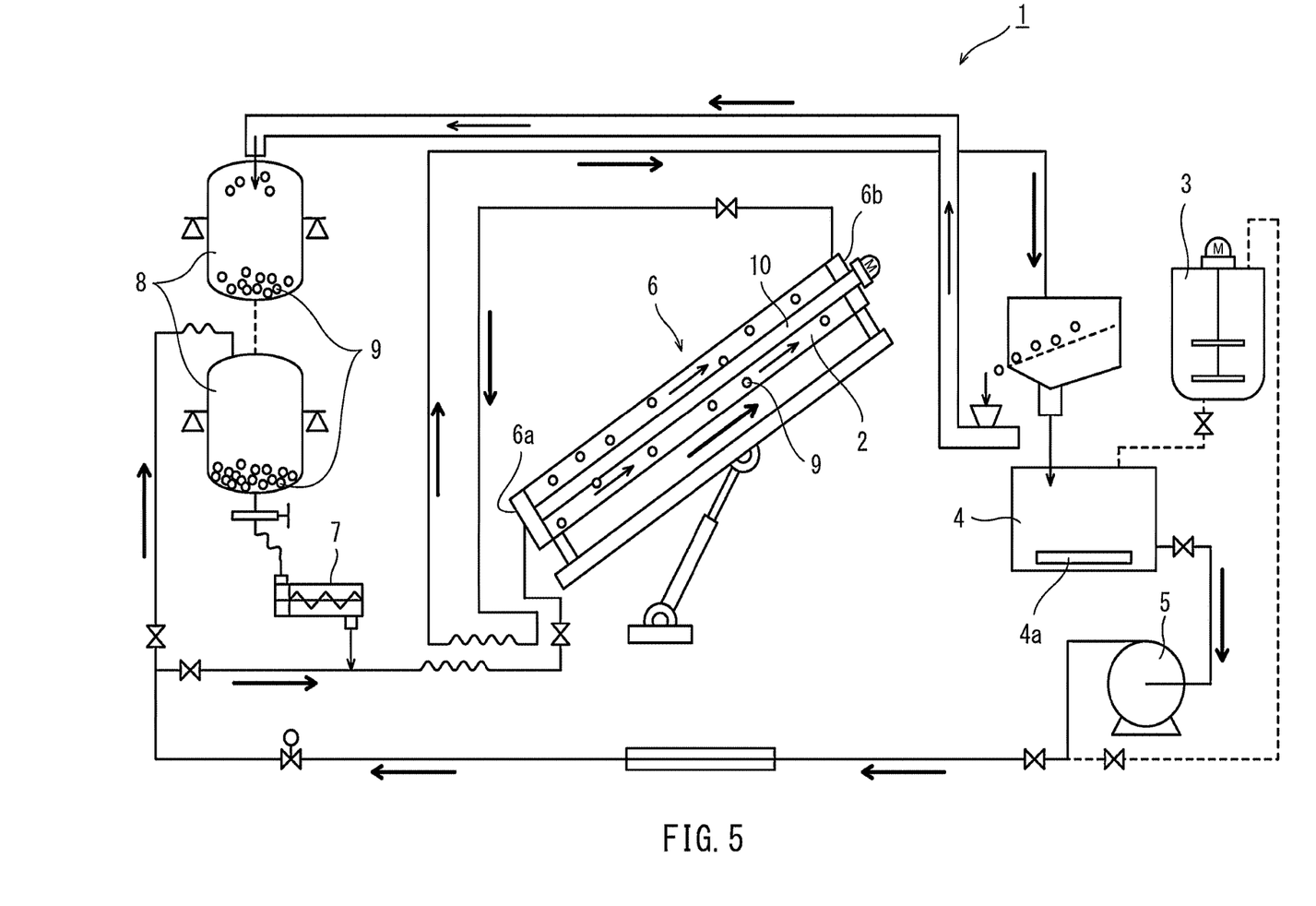
FIG. 5 is a schematic diagram of a flow loop testing machine 1 used in the evaluation of the state of cuttings transport, cuttings behavior, and the speed of cuttings transport.

The State of Cuttings Transport, cuttings behavior, and the speed of cuttings transport were evaluated by using a flow loop testing machine, which is described hereinafter with reference to the drawings. FIG. 5 is a schematic diagram showing a flow loop testing machine 1. A drilling fluid (sample) 2 was fed from a mud tank 3 to a return tank 4. The drilling fluid (sample) 2 was heated in the return tank 4 by a heater 4a until the temperature of the drilling fluid (sample) 2 reached 30° C., and was then fed to an annular section 6 by using a mud pump 5. At the time, the annular section 6 was set such that a direction from a lower part (bottomhole) 6a toward an upper part (wellhead) 6b of the annular section 6 was the upward vertical direction (i.e., the inclination angle of a drill pipe 10 was 0°).

In a cuttings feeder 7 disposed on a feeding path from the return tank 4 to the annular section 6, the drilling fluid (sample) 2 was mixed with cuttings 9 stored in a cuttings storage tank 8. The drilling fluid (sample) 2 mixed with the cuttings 9 was injected into the annular section 6 from the lower part (bottomhole) 6a. Then, the state of cuttings transport and the cuttings behavior were observed, and the speed of cuttings transport was calculated.

The annular section 6 simulates a well. In the annular section 6, the drill pipe 10 of 0.0524 m (=2.063 inches) is disposed inside a circular cylinder that simulates an annulus having an overall length of 9 m and a wellbore diameter (the inner diameter of the well) of 0.127 m (=5 inches).

The cuttings 9 used herein were ceramic cuttings (two types of cuttings colored in red and white) having a diameter of 3 mm. In order to improve the visibility of the cuttings, the red cuttings in a small amount were mixed in the white cuttings.

Figure 6:
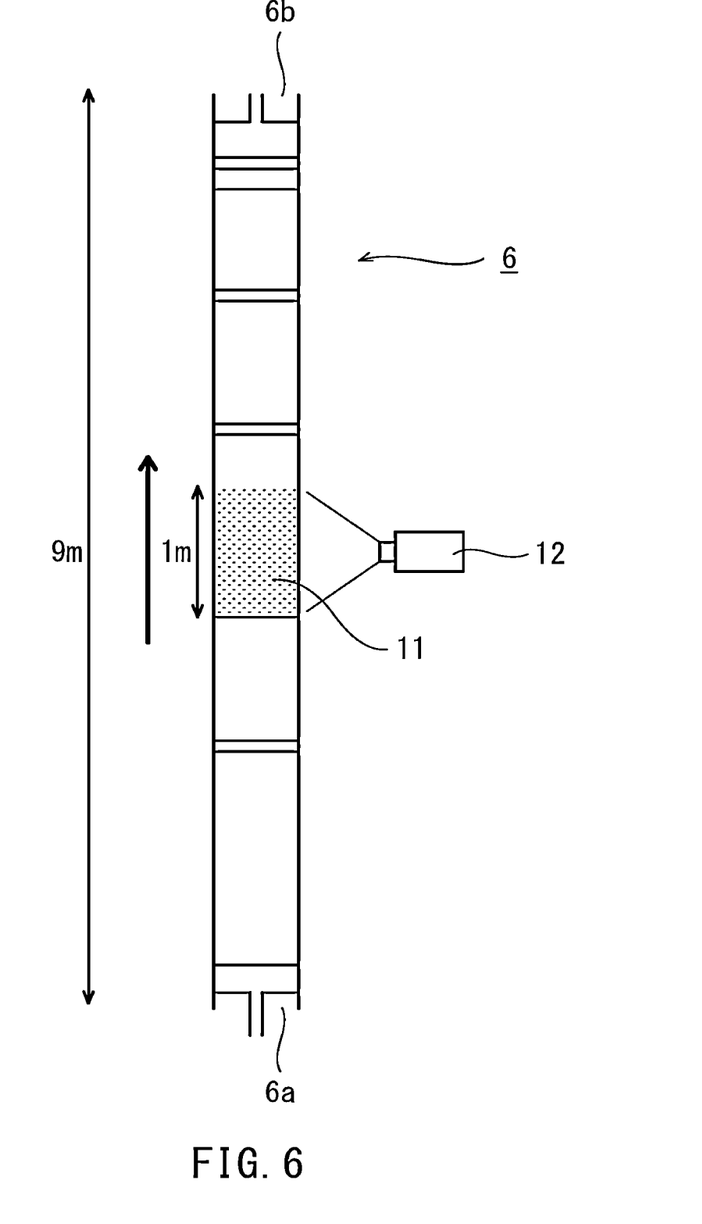
FIG. 6 illustrates an observation segment 11, in which the state of cuttings transport, cuttings behavior, and the speed of cuttings transport are observed.

FIG. 6 illustrates an observation segment 11 of the annular section 6, in which the state of cuttings transport, the cuttings behavior, and the speed of cuttings transport were observed. A video image of the cuttings 9 that flowed through the 1-meter middle observation segment 11 of the annular section 6 was captured with a video camera 12 (FDR-X3000R available from Sony Corporation, the number of recording pixels: 1920×1080, frame rate: 120 fps, video recording format: XAVC S HD, and an angle of view setting: wide angle), and the behavior and the speed of the cuttings 9 were analyzed by using numerical analysis software MATLAB. The analysis was performed on red-color elements that were extracted from analysis target frames by using a color threshold.

The observation was made under the following conditions: flow rates of 50, 40, 30, 25, and 20 m³/h of the drilling fluid (sample) 2; an injection amount of 2.1 L/min of the cuttings 9, corresponding to a drilling rate of 10 m/h; and rotation speeds of 0 rpm (no rotation) and 60 rpm of the drill pipe 10. It should be noted that the rotation speed of the drill pipe 10 was set to 0 rpm (no rotation) for the first 3 minutes of the observation, and then the observation was made for another three minutes with the rotation speed of the drill pipe 10 set to 60 rpm.

The results of the analysis and evaluation of the state of cuttings transport are shown in Table 12. The following evaluation criteria were applied:
Bad: the entire cuttings stagnated or settled.
Not so good: the cuttings partly stagnated or settled.
Good: the entire cuttings were smoothly transported without stagnation or settling.

cuttings behavior was unstable, whereas at flow rates of 25 to 50 m³/h, the entire cuttings were transported in a perpendicular direction in a stable manner. On the other hand, in the cases where the drilling fluids of the Comparative Examples were used, the cuttings behavior was unstable at a flow rate of 30 m³/h as well as at a flow rate of 25 m³/h or lower. It should be noted that, in the present disclosure, the perpen-

TABLE 12

| | | State of Cuttings Transport (Drill pipe rotation speed: 0 rpm (no rotation)) | | | |
|---|---|---|---|---|---|
| Drilling fluid flow rate (m³/h) | Drilling fluid flow velocity (cm/s) | Comp. Ex. A-1 Water only | Comp. Ex. A-2 PAC (1.0 g/L) | Comp. Ex. A-3 PHBH fibers (1.0 g/L) | Ex. A-1 PAC (1.0 g/L) PHBH fibers (1.0 g/L) |
| 50 | 130.5 | Good | Good | Good | Good |
| 40 | 104.4 | Good | Good | Good | Good |
| 30 | 78.3 | Not so good | Good | Good | Good |
| 25 | 65.3 | Not so good | Good | Not so good | Good |
| 20 | 52.2 | Not so good | Not so good | Not so good | Good |

As shown in Table 12, in the case where the drilling fluid of the Example was used, at all the flow rates, the entire cuttings were transported smoothly without stagnation or settling. On the other hand, in the cases where the drilling fluids of the Comparative Examples were used, although the cuttings tended to be transported relatively smoothly at higher flow rates, part of the cuttings stagnated or settled at lower flow rates.

The results of the analysis and evaluation of the cuttings behavior are shown in Table 13. The following evaluation criteria were applied:
Bad: displacement directions (vertical and horizontal directions) of the cuttings and the flow velocity of the cuttings were non-uniform and unstable.
Good: displacement directions (vertical and horizontal directions) of the cuttings and the flow velocity of the cuttings were uniform and stable.

dicular direction is the upward vertical direction. As previously described, the annular section 6 was set in the upward vertical direction (i.e., the inclination angle of the drill pipe 10 was 0°). Accordingly, the perpendicular direction is also the direction from the lower part (bottomhole) 6a toward the upper part (wellhead) 6b of the annular section 6. The horizontal direction is a direction that forms a right angle with the perpendicular direction.

The speed of cuttings transport at a rotation speed of 0 rpm (no rotation) of the drill pipe 10 and the speed of cuttings transport at a rotation speed of 60 rpm of the drill pipe 10 were calculated based on the displacement of the cuttings in the perpendicular direction per unit time. The calculation results are shown in Table 14 and Table 15.

TABLE 13

| | | Cuttings Behavior (Drill pipe rotation speed: 0 rpm (no rotation)) | | | |
|---|---|---|---|---|---|
| Drilling fluid flow rate (m³/h) | Drilling fluid flow velocity (cm/s) | Comp. Ex. A-1 Water only | Comp. Ex. A-2 PAC (1.0 g/L) | Comp. Ex. A-3 PHBH fibers (1.0 g/L) | Ex. A-1 PAC (1.0 g/L) PHBH fibers (1.0 g/L) |
| 50 | 130.5 | Good | Good | Good | Good |
| 40 | 104.4 | Good | Good | Good | Good |
| 30 | 78.3 | Bad | Good | Bad | Good |
| 25 | 65.3 | Bad | Bad | Bad | Good |
| 20 | 52.2 | Bad | Bad | Bad | Bad |

As shown in Table 13, in the case where the drilling fluid of the Example was used, at a flow rate of 20 m³/h, the

TABLE 14

| | | Speed of Cuttings Transport (cm/sec) (Drill pipe rotation speed: 0 rpm (no rotation)) | | | | Increase Rate |
|---|---|---|---|---|---|---|
| Drilling fluid flow rate (m³/h) | Drilling fluid flow velocity (cm/s) | Comp. Ex. A-1 Water only | Comp. Ex. A-2 PAC (1.0 g/L) | Comp. Ex. A-3 PHBH fibers (1.0 g/L) | Ex. A-1 PAC (1.0 g/L) PHBH fibers (1.0 g/L) | (%) Ex. A-1/ Comp. Ex. A-2 |
| 50 | 130.5 | Unmeasurable (behavior unstable) | 93.8 | Unmeasurable (behavior unstable) | 103.1 | 9.9 |

TABLE 14-continued

| | | Speed of Cuttings Transport (cm/sec) (Drill pipe rotation speed: 0 rpm (no rotation)) | | | | Increase Rate |
|---|---|---|---|---|---|---|
| Drilling fluid flow rate (m³/h) | Drilling fluid flow velocity (cm/s) | Comp. Ex. A-1 Water only | Comp. Ex. A-2 PAC (1.0 g/L) | Comp. Ex. A-3 PHBH fibers (1.0 g/L) | Ex. A-1 PAC (1.0 g/L) PHBH fibers (1.0 g/L) | (%) Ex. A-1/ Comp. Ex. A-2 |
| 40 | 104.4 | Unmeasurable (behavior unstable) | 71.3 | Unmeasurable (behavior unstable) | 88.3 | 23.8 |
| 30 | 78.3 | Unmeasurable (behavior unstable) | 54.9 | Unmeasurable (behavior unstable) | 66.2 | 20.6 |
| 25 | 65.3 | Unmeasurable (behavior unstable) | 34.5 | Unmeasurable (behavior unstable) | 57.2 | 65.8 |
| 20 | 52.2 | Unmeasurable (behavior unstable) | 21.5 | Unmeasurable (behavior unstable) | 34.4 | 60.0 |

TABLE 15

| | | Speed of Cuttings Transport (cm/sec) (Drill pipe rotation speed: 60 rpm) | | | | Increase Rate |
|---|---|---|---|---|---|---|
| Drilling fluid flow rate (m3/h) | Drilling fluid flow velocity (cm/s) | Comp. Ex. A-1 Water only | Comp. Ex. A-2 PAC (1.0 g/L) | Comp. Ex. A-3 PHBH fibers (1.0 g/L) | Ex. A-1 PAC (1.0 g/L) PHBH fibers (1.0 g/L) | (%) Ex. A-1/ Comp. Ex. A-2 |
| 50 | 130.5 | Unmeasurable (behavior unstable) | 108.6 | Unmeasurable (behavior unstable) | 114.4 | 5.3 |
| 40 | 104.4 | Unmeasurable (behavior unstable) | 75.7 | Unmeasurable (behavior unstable) | 81.6 | 7.8 |
| 30 | 78.3 | Unmeasurable (behavior unstable) | 51.1 | Unmeasurable (behavior unstable) | 56.9 | 11.4 |
| 25 | 65.3 | Unmeasurable (behavior unstable) | 34.6 | Unmeasurable (behavior unstable) | 44.6 | 28.9 |
| 20 | 52.2 | Unmeasurable (behavior unstable) | 24.6 | Unmeasurable (behavior unstable) | 38.2 | 55.3 |

As shown in Table 14 and Table 15, in the case where the drilling fluid of the Example was used, at all the flow rates under both the rotation speed conditions of 0 rpm (no rotation) and 60 rpm of the drill pipe 10, the speed of cuttings transport was faster than in the case where the drilling fluid of Comparative Example A-2 was used. In addition, as indicated by the ratio of the speed of cuttings transport in Example A-1 to the speed of cuttings transport in Comparative Example A-2 (i.e., increase rate (%)), it is understood that particularly at lower flow rates, the increase rate is high and the speed of cuttings transport by the drilling fluid of the Example is excellent. It should be noted that since the behavior of the cuttings was unstable in Comparative Example A-1 and Comparative Example A-3, it was impossible to calculate the speed of cuttings transport in Comparative Example A-1 and Comparative Example A-3.

Here, the relationship between the flow rate and the shear rate of a drilling fluid is described. In a pipe, flow rate distribution and shear rate distribution are present in the radial direction. In the case of a Newtonian fluid, in a pipe without the drill pipe, the shear rate is 0 (minimized) around the center of the pipe passage and maximized at a position on the pipe wall.

In the case of a Non-Newtonian fluid (Bingham plastic fluid), i.e., a typical drilling fluid, similar to a Newtonian fluid, the shear rate has a tendency to be minimized around the center of the pipe passage and maximized at a position on the pipe wall although strictly speaking, the shear rate distribution of a Non-Newtonian fluid is different from the shear rate distribution of a Newtonian fluid. Therefore, for the purpose of simplifying the calculation, a Newtonian fluid model can be used as a simple analytic model for an in-pipe flow of a drilling fluid.

Further, in the case of using the flow loop testing machine 1 shown in FIG. 5, by using a Newtonian fluid model, the relationship between the flow rate and the flow velocity distribution of the drilling fluid can be represented by an equation (4) shown below, and the relationship between the flow rate and the maximum value of the shear rate of the drilling fluid can be represented by an equation (5) shown below. Based on the equation (5) shown below, among the evaluation conditions for evaluating the state of cuttings transport, cuttings behavior, and the speed of cuttings transport in Experiment 2, the flow rates 50, 40, 30, 25, and 20 (m³/h) of the drilling fluid (sample) 2 correspond to in-pipe shear rate distribution ranges of 0 to 145, 0 to 116, 0 to 87, 0 to 72.5, and 0 to 58 (1/s), respectively. It should be noted that, during well drilling, the shear rate in the annulus is about 10 to 100 (1/s) (see "Boringu You Deisui" (Drilling Mud for Boring)<New Edition>, authored by Bunkichi Okino, May 25, 1981, p. 26).

[Math. 4]

$$v(r) = \frac{32Q}{\pi D^4} r^2, \quad (4)$$

where
- v(r) is the flow velocity distribution (m/s),
- Q is the flow rate of the fluid (m³/s),
- D is the inner diameter (m) of a circular pipe, and
- r is an arbitrary position (m) in the radial direction of the circular pipe.

[Math. 5]

$$\dot{\gamma}(D_2/2) = \frac{8 D_2 Q}{\pi (D_2 - D_1)^4}, \quad (5)$$

where
- $\dot{\gamma}(D_2/2)$ is the maximum value (s⁻¹) of the shear rate,
- $D_2$ is the wellbore diameter (the inner diameter of the well) (m) of the annulus,
- $D_1$ is the outer diameter (m) of the drill pipe, and
- Q is the flow rate of the fluid (m³/s).

It is clear from Tables 11, 12, 13, and 14 that the drilling fluid of the Example is excellent in terms of the state of cuttings transport, cuttings behavior, and the speed of cuttings transport particularly under low flow rate conditions (i.e., the closer the flow rate condition is to the condition of a low shear rate region, the better the state of cuttings transport, the cuttings behavior, and the speed of cuttings transport). This tendency indicates that the cuttings can be transported smoothly in both low and high shear rate regions. Thus, it is understood that the drilling fluid of the Example has excellent cuttings transport capability and excellent hole cleaning capability.

REFERENCE SIGNS LIST 1 flow loop testing machine
2 drilling fluid (sample)
3 mud tank
4 return tank
5 mud pump
6 annular section
7 cuttings feeder
8 cuttings storage tank
9 cuttings
10 drill pipe
11 observation segment
12 video camera

The invention claimed is:

1. A drilling fluid, comprising:
   water;
   biodegradable fibers; and
   a thickener comprising a biodegradable polysaccharide,
   wherein a content of the biodegradable polysaccharide in the drilling fluid is from 0.01 g/L to 5 g/L, and
   wherein the biodegradable fibers are fibers comprising poly(3-hydroxybutyrate-co-3-hydroxyhexanoate).

2. The drilling fluid according to claim 1, wherein the thickener consists of the biodegradable polysaccharide.

3. The drilling fluid according to claim 1, wherein the biodegradable fibers have a fiber length of from 3 mm to 100 mm.

4. The drilling fluid according to claim 1, wherein a content of the biodegradable fibers is from 5 parts by weight to 500 parts by weight, relative to 100 parts by weight of the thickener.

5. The drilling fluid according to claim 1, wherein the biodegradable polysaccharide is at least one selected from the group consisting of carboxymethyl cellulose, polyanionic cellulose, xanthan gum, and guar gum.

6. The drilling fluid according to claim 1, wherein the biodegradable fibers have a fineness of from 1 dtex to 100 dtex.

7. The drilling fluid according to claim 1, wherein the fibers comprising poly(3-hydroxybutyrate-co-3-hydroxyhexanoate) have a length of from 3 mm to 100 mm and a fineness of from 1 dtex to 100 dtex.

8. The drilling fluid according to claim 1, wherein a content of the biodegradable fibers is from 20 parts by weight to 40 parts by weight, relative to 100 parts by weight of the thickener.

9. The drilling fluid according to claim 1, wherein the thickener further comprises an inorganic mineral, an organic colloid, or a combination thereof.

10. The drilling fluid according to claim 1, wherein the content of the biodegradable polysaccharide in the drilling fluid is from 0.1 git to 3 g/L.

11. A drilling method, comprising:
    drilling a well while feeding a drilling fluid into the well; and
    discharging cuttings that are produced by the drilling to outside the well,
    wherein
    the drilling fluid comprises water, biodegradable fibers, and a thickener comprising a biodegradable polysaccharide,
    a content of the biodegradable polysaccharide in the drilling fluid is from 0.01 g/L to 5, and
    the biodegradable fibers are fibers comprising polv(3-hydroxybutyrate-co-3-hydroxyhexanoate).

12. The drilling method according to claim 11, wherein the thickener consists of the biodegradable polysaccharide.

13. The drilling method according to claim 11, wherein the drilling is riser drilling or riserless drilling in a marine environment.

14. The drilling method according to claim 11, wherein the drilling is riserless drilling in a marine environment.

* * * * *